United States Patent
Kern et al.

[11] 3,722,609
[45] Mar. 27, 1973

[54] DRILLING TOOL AND BEARING SYSTEM

[75] Inventors: Loyd R. Kern, Irving; John H. Striegler, Richardson, both of Tex.

[73] Assignee: Atlantic Richfield Company, New York, N.Y.

[22] Filed: Aug. 9, 1971

[21] Appl. No.: 170,079

[52] U.S. Cl. ............................... 175/92, 175/372
[51] Int. Cl. ........................................... E21b 3/08
[58] Field of Search........175/92, 104, 107, 101, 371, 175/372; 415/502

[56] References Cited

UNITED STATES PATENTS

| | | | |
|---|---|---|---|
| 2,646,962 | 7/1953 | Wagner | 175/107 X |
| 2,937,008 | 5/1960 | Whittle | 175/107 X |
| 2,990,895 | 7/1961 | Works et al. | 175/107 |
| 3,159,222 | 12/1964 | Hammer et al. | 175/107 |
| 3,356,338 | 12/1967 | Ioanesyan et al. | 175/107 X |

FOREIGN PATENTS OR APPLICATIONS

| | | | |
|---|---|---|---|
| 1,093,305 | 11/1960 | Germany | 175/107 |
| 1,923,282 | 1/1970 | Germany | 175/107 |

Primary Examiner—David H. Brown
Attorney—Blucher S. Tharp et al.

[57] ABSTRACT

A bearing system in an annulus between a shaft and a housing, the bearing system containing a seal means, and the seal means contacting a sealing surface means which maintains full sealing contact with the seal means notwithstanding lateral displacement of the shaft. A downhole drilling tool employing the above bearing system together with a downhole motor operably connected to the shaft of the bearing system, the other end of the shaft being adapted to carry a drilling bit.

8 Claims, 4 Drawing Figures

3,722,609

INVENTORS:
LOYD R. KERN
JOHN H. STRIEGLER

ATTORNEY

INVENTORS:
LOYD R. KERN
JOHN H. STRIEGLER

Roderick W. MacDonald
ATTORNEY

DRILLING TOOL AND BEARING SYSTEM

BACKGROUND OF THE INVENTION

When one or more bearings are operably connected between a housing and a shaft, there also being a seal means between the housing and shaft, the efficiency of the seal means can be less than desired, particularly after some wear has occurred on the seal.

One cause of the decreased efficiency of the seal can be misalignment of the shaft or housing or both relative to one another due to numerous discrepancies such as a variance in the size of the bearings themselves, a variance in machine work tolerances, and the like. These variances can cause the contacting area between the seal and the member upon which the seal bears to be less than complete so that only part of the seal is actually contacting a member in the desired sealing manner. Thus, substantially less than the complete sealing area of the seal is being employed and the sealing efficiency is correspondingly reduced.

It is highly desirable to have a seal means between the housing and shaft which is arranged in such a manner that substantially the full area of contact of the seal with the member upon which the seal is to bear is maintained notwithstanding any lateral movement of the shaft or the housing relative to one another due to the above-mentioned variances in construction.

The desirability of such a seal means is particularly acute in the wellbore drilling area when a downhole motor is used to rotate a bit. This is so because if the seal in the downhole drilling tool does not last at least as long as the bit, a considerable loss in time and money is realized if the drilling operation has to be terminated before the bit is completely worn out. Improper sealing in a downhole drilling tool can cause premature failure of the bearings which will then necessitate removal of the downhole drilling tool from the wellbore even if the bit is not completely worn out at the time. This need for efficient sealing in a downhole drilling tool is extremely important in conventional drilling and this importance is further amplified to the critical point in that area of the drilling field known as "slim hole" drilling wherein a borehole of small diameter, e.g. up to about 6 inches, preferably from about two to about 4 inches, is drilled while rotating the bit at very high rates of at least about 400 rpm, generally from about 400 to about 3000 rpm.

SUMMARY OF THE INVENTION

According to this invention there is provided a well drilling tool for use downhole wherein a sealing means is provided together with a sealing surface means so that the sealing surface means maintains substantially full area contact with the seal means notwithstanding lateral displacement of the shaft or housing member of the tool.

There is also provided a bearing system employing the seal means and sealing surface means mentioned hereinabove and described in greater detail hereinafter.

Accordingly, it is an object of this invention to provide a new and improved bearing and sealing system. It is another object to provide a new and improved bearing and sealing system for use in downhole drilling tools. It is another object to provide a new and improved bearing and sealing system for use in a downhole drilling tool in conjunction with a downhole motor wherein substantially complete sealing is maintained notwithstanding any lateral movement of the members in the tool. It is another object to provide a new and improved well drilling tool for use downhole in a wellbore to rotate a bit using seal means which will last at least as long as the bit itself.

Other aspects, objects, and advantages of this invention will be apparent to those skilled in the art from this disclosure and the appended claims.

DETAILED DESCRIPTION OF THE INVENTION

Figure 1:
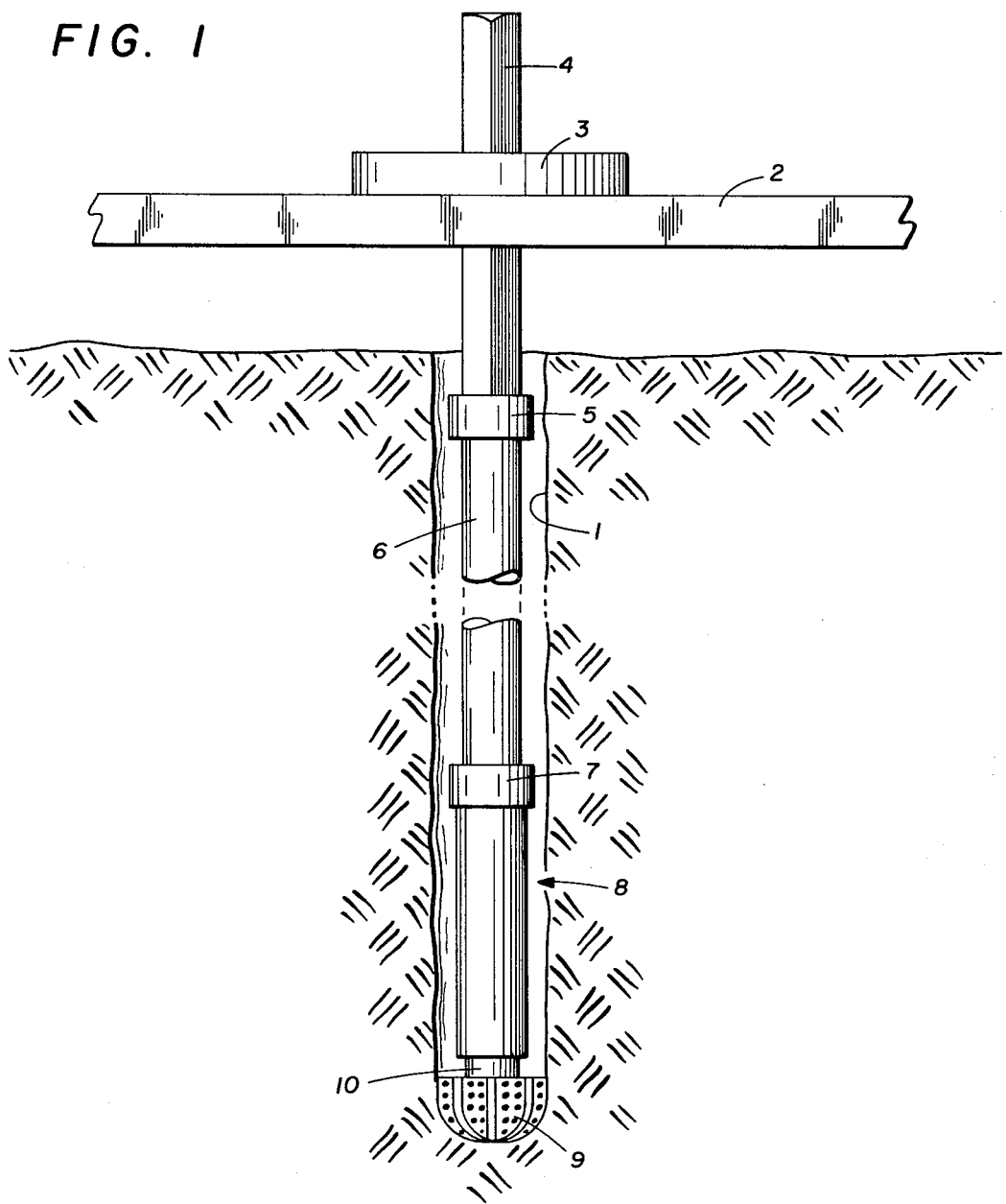
FIG. 1 shows well drilling apparatus in which this invention can be employed.

More specifically, FIG. 1 shows a wellbore 1 in the earth's surface under the working floor 2 of a conventional rotary drilling rig.

Working floor 2 carries a conventional rotary table 3 which is powered by a conventional earth's surface motor means (not shown) and which, when rotated, in turn rotates square kelly 4. Kelly 4 is coupled by means of coupling 5 to drill string 6 which is normally composed of a plurality of individual sections of drill pipe coupled together by couplings such as coupling 5. Drill string 6 is coupled by means of coupling 7 at its lower end to downhole tool 8 which in turn carries diamond drill bit 9 on shaft 10.

In operation, rotary table 3 is rotated by a surface motor and in turn rotates, respectively, kelly 4, drill string 6, tool 8, and bit 9. Tool 8 is then operated on its own to speed up the rotation of bit 9 to any desired rate for the particular drilling condition.

In the case of slim hole drilling, if the very high rotational rate for the bit were to be achieved solely by rotating drill string 6 with a surface motor, catastrophic vibration of drill string 6 could be encountered. At high rotational speeds of a long drill string, the pipe tends to bounce from one side of the well bore to the other at a faster and faster rate until catastrophic vibration sets in and results in failure of the drill string such as by twisting off one section of drill pipe from an adjacent section of drill pipe at their common coupling joint. By use of the apparatus of this invention, drill string 6 can be rotated by rotary table 3 at a rate which avoids catastrophic vibration. However, the bit is still rotated at slim hole rotation rates by operation of downhole tool 8. Thus, the bit can be rotated a first speed increment using downhole tool 8 and further additional rotating speed of the bit can be accomplished by an additional speed increment provided by a surface motor means rotating drill string 6.

Downhole tool 8 can be located substantially any place along the length of drill string 6 but is preferably closer to the bit than the earth's surface when the borehole is deeper than the total length of the bit and the tool 8. Tool 8 is generally located adjacent the bit as shown in FIG. 1. It should be understood, however, that one or more tools 8 can be employed and can be spaced upwardly from the bit along the length of the drill string as desired.

Generally, any conventional downhole motor means can be employed in tool 8. Such motor means are commercially available and well known in the art. These motors include downhole electric motors, turbine operated motors such as the "turbo drill" wherein the drilling mud passing downwardly through the interior of the drill string runs a turbine and the turbine turns a shaft connected to the drill bit, or motors which are in reality a fluid pump in reverse such as the "dyna-drill." Construction and operation of fluid-pump-in-reverse motors is fully and completely disclosed in U.S. Pat. No. 3,112,801, the disclosure of which is incorporated herein by reference. Generally, these motors have a stator and rotor which, at least when in operation if not otherwise, operate in relation to one another and are connected to one another by way of frictional forces including fluid friction and mechanical friction, or by way of an electrical field, so that torque can be transmitted from the drill string 6 to the shaft which connects the downhole motor to the bit. In this way, rotational speed of the drill string 6 caused by operation of rotary table 3 can be transmitted to and added to the rotational rate output of the downhole motor thereby imparting a cumulative total rotation rate to the bit which is greater than the individual rotation rates of the drill string 6 and the downhole motor.

Figure 2:
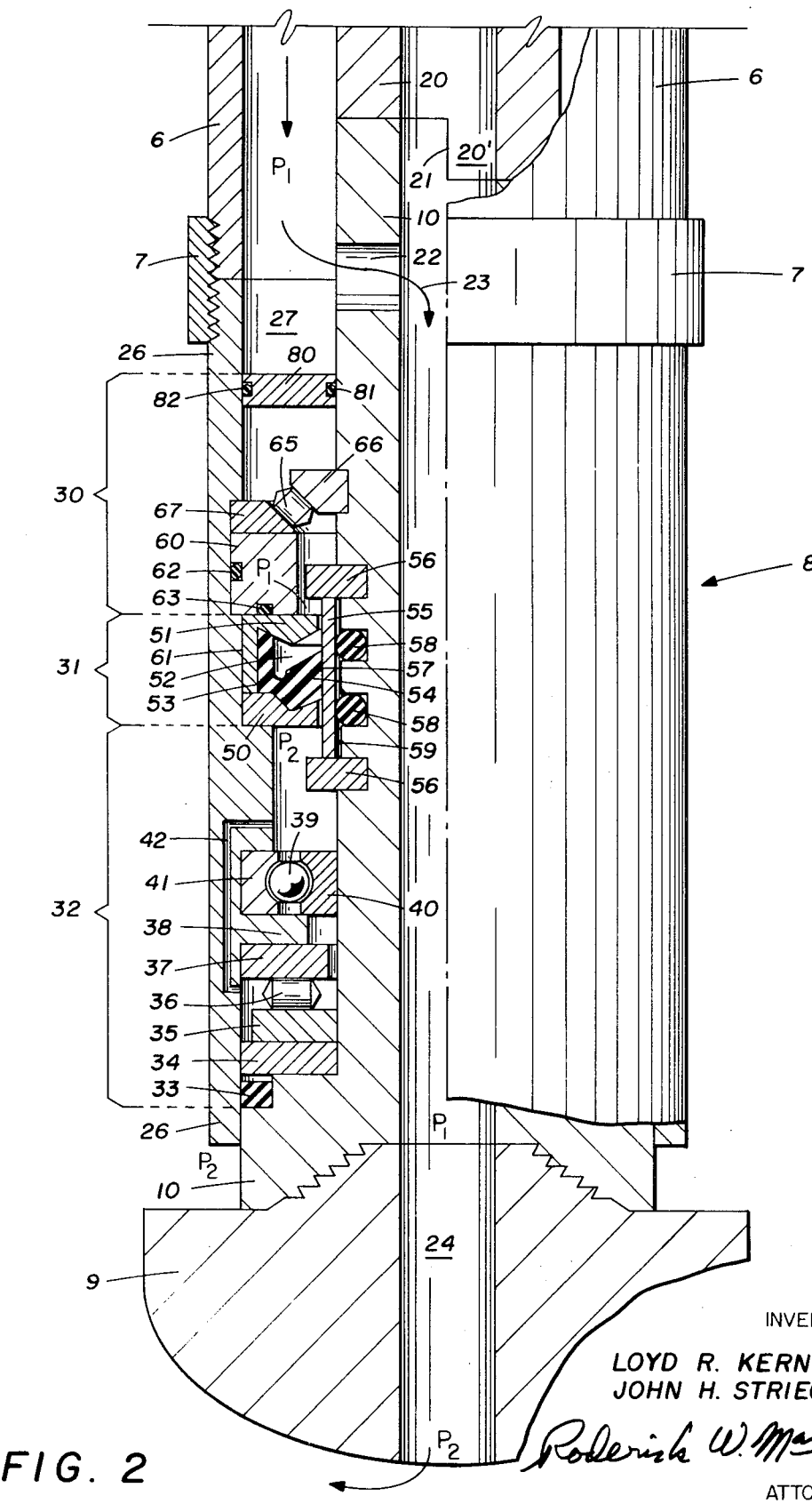
FIG. 2 shows one embodiment within this invention.

FIG. 2 shows a partial cross-sectional interior of tool 8 and shows bit 9 to threadably engage hollow shaft 10 which in turn engages shaft 20. Shaft 20 is powered by a conventional downhole motor means (not shown). Shaft 10 can engage shaft 20 in any manner such as by a plurality of splines 20' on shaft 20 engaging a plurality of matching slots 21 in shaft 10. Shafts 10 and 20 can be made integral but are preferably separable for ease of replacement of the downhole motor.

Shaft 20 has one or more apertures 22 therein which serve as means to pass drilling fluid around the bearings 65, etc., by admitting drilling fluid from outside the shaft into the interior of the shaft as shown by arrow 23. The drilling fluid then passes down the interior of the shaft through the interior conduit 24 of bit 9 and out around the outer surface of bit 9 as shown by arrow 25 to cool the bit and sweep rock cuttings away from the bit. The rock cuttings are carried upwardly by the drilling fluid in the annulus between the inner wall of the wellbore and the outer surface of drill string 6. When the drilling fluid reaches the surface of the earth, most of the cuttings are removed and the drilling fluid is then returned down the interior of drill string 6 for reuse.

Annular housing 26 is concentric with and external to shaft 10 thereby providing an annular chamber 27 between the exterior of shaft 10 and the interior of housing 26. The upper end of housing 26, i.e., the end furthest removed from bit 9, is threaded so as to be connectible to the lower end of drill string 6 by way of coupling 7.

The end of housing 26 closest to bit 9 touches or is at least quite close to shaft 10 but is slidable around and along shaft 10, i.e., not fixed by welding, bolting, or the like to shaft 10, so that shaft 10 can rotate independently of housing 26.

Annular chamber 27 is divided into three distinct sections. The upper section 30 contains a first bearing means, the middle section 31 contains a first seal means, and the third section 32 contains both a second bearing means and a second seal means.

Section 32 carries annular second seal means 33 which rotates with shaft 10 but bears against the interior wall of housing 26 thereby providing a dynamic seal between shaft 10 and housing 26 so that drilling fluid outside housing 26 cannot pass into chamber 27 and lubricant cannot leak out of section 32 at this point even though housing 26 and shaft 10 are not physically joined to one another at this point. Above second seal means 33 is an annular spacer means 34 upon which rests lower annular race 35 of roller bearings 36. Bearings 36 are disposed horizontally to transmit thrust forces acting substantially parallel to the longitudinal axis of shaft 10 in either direction, i.e., toward or away from bit 9. Upper annular race 37 confines the plurality of roller bearings 36 and completes the thrust bearing device for section 32. Above race 37 is disposed shoulder 38 which transmits bit weight from roller bearings 36 to housing 26.

Above shoulder 38 is disposed ball bearings 39 between opposed annular races 40 and 41. This ball bearing device transmits radial forces which act at an angle to the longitudinal axes of shaft 10 and housing 26.

Section 32 therefore contains two bearing devices for transmitting radial and thrust forces. It also contains a substantial amount of open space which serves as a lubricant reservoir after the lubricant has been injected by way of a conventional grease fitting (not shown). To ensure that there is an evenness of lubrication for both bearing devices in section 32, one or more conduit means 42 is provided through housing 26 and is in open communication with open areas adjacent roller bearings 36 and ball bearings 39. Since roller bearings 36 force lubricant outwardly toward housing 26 by centrifugal force, lubricant circulates from the vicinity of roller bearings 36 through conduit means 32 and past ball bearings 39 back to roller bearings 36. In this manner, not only is a reservoir of lubricant provided in the interior section 32, but circulating means is provided so that uniform lubrication of all bearing devices in section 32 is maintained.

Section 31 contains a first seal means which is composed of a lower, metal, annular, support member 50 and an upper, metal, annular, support member 51 which together define an open annular space 52 that is partially filled with a resilient, annular seal member 53. Seal member 53 is a lip seal in that annular lip portion 54 is bendable toward and away from shaft 10 as opposed to a face seal such as seal 33 where the sealing surface is not bendable in the manner of lip 54. Members 50, 51 and 53 are carried by housing 26 so that when housing 26 is stationary these members are also stationary even though shaft 10 may be rotating. This first seal means is a dynamic seal which bears upon shaft 10 whether both shaft 10 and housing 26 are stationary or either or both are moving. The lip portion 54 of resilient member 53 which contacts shaft 10 is pointed upwardly toward section 30 so that pressurized fluid which may enter space 22 from section 30 will force member 54 more firmly against shaft 10 thereby effectively sealing section 30 and its contained pressure from section 32 and its contained pressure even though the two contained pressures are substantially different from one another.

Member 53 can be composed of any plastic material, particularly rubber, and is impregnated with a lubricant, such as a solid lubricant, e.g., graphite, $MoS_2$, etc., so that as the rubber portion of the lip is worn away, fresh lubricant is continuously exposed to shaft 10. Member 53 also contains a plurality of layers of fibers, one or more of the layers being composed of a porous material such as cotton or rayon which will act as a wick in picking up and holding liquid lubricant inside member 53, and one or more layers of fibers that have a tensile strength greater than the wick fiber, e.g. nylon, polypropylene, etc., to strengthen member 53 and particularly lip 54. The layers can be present in any relative amounts but are preferably present in the ratio of 1/1 to 1/2 of wick layers/strength layers. Numerous layers can be employed, preferably from about 50 to about 100 total layers in each member 53. Each layer can be composed of a plurality of fibers arranged in any direction or combination of directions, e.g., a woven fabric with part of the individual fibers running substantially at right angles with the remaining individual fibers.

Elements 50, 51, and 53, in combination as shown in FIG. 2, comprise a single unit and a plurality of these units can be employed in section 31 if desired. For example, from one to ten of these units stacked on top of one another in section 31 can be employed as a dynamic seal which effectively isolates the pressures in sections 30 and 32 from one another.

Immediately above the last member 51 in section 31 is annular spacer 60 which seals the pressure in section 30 from interface 61 between member 51 and the interior wall of housing 26 by way of O-rings 62 and 63. Other conventional seal means can be employed in lieu of O-rings 62 and 63.

Above spacer 60 is a plurality of roller bearings 65 which are carried at an angle between the longitudinal and transverse axes of shaft 10 and between opposing annular races 66 and 67. Thus, roller bearings 65 transmit both radial and thrust forces. The surfaces of races 66 and 67 are angled with respect to one another so that roller bearings 65 will transmit thrust forces acting in the direction of bit 9. When the bit is not set down on the bottom of the wellbore but drilling fluid pressure is applied through chamber 27, the resulting thrust force on shaft 10 toward bit 9 will be transmitted by roller bearings 65 since roller bearings 36 will not transmit a force acting in this manner on shaft 10. A grease fitting (not shown) can be provided so that lubricant can be injected into the interior of section 30 for lubrication of the bearing device therein.

The upper end of section 30 is defined by a seal means which is a piston means 80 that is rotatable and also movable longitudinally parallel to the longitudinal axis of shaft 10. Piston 80 seals the interior of section 30 from the upper remaining portion of chamber 27 in the vicinity of aperture 22 by way of O-rings 81 and 82. Any desired arrangement of O-rings can be employed so long as a dynamic sealing effect is achieved. Of course, sealing means other than O-rings can be employed so long as the desired moving-sealing results are realized. Piston 80 can move toward race 66 or away from race 66 thereby decreasing or increasing, respectively, the volume between piston 82 and roller bearings 65. This movement depends upon the amount of lubricant present in that space. When the lubricant in that space decreases, the pressure from the drilling fluid above piston 80 pushes that piston downwardly toward race 66 thereby forcing all available lubricant downwardly toward roller bearings 65 and insuring that lubricant is always present for those roller bearings. When additional lubricant is added by way of a grease fitting, piston 80 moves upwardly away from race 66 thereby increasing the reservoir of lubricant maintained for roller bearings 65.

The right side section of FIG. 2 which, for sake of simplicity, is not shown would appear as the left side just described since most of the elements are annular and extend completely around annular chamber 27.

Ordinarily lip 54 would bear in a sealing manner against the exterior surface of shaft 10. However, in accordance with this invention, there is provided a sealing surface means 55 which is an elongated section carried intermediate lip 54 and shaft 10. In FIG. 2 the elongated section of the surface sealing means is A right cylindrical sleeve which is carried by shaft 10 between annular snap rings 56—56. Sleeve 55 is carried by shaft member 10 while housing member 26 carries seal means 53. Shaft 10 is, therefore, the non-seal-carrying member in the arrangement of FIG. 2.

Sleeve 55 is annular and thereby extends for the full sealing-contacting area 57 of lip 54. Sleeve 55 is concentric with shaft 10 but spaced therefrom by way of resilient O-ring seal means 58 so that there is a finite space 59 between the interior surface of sleeve 55 and the exterior surface of shaft 10, this space 59 generally being from about 0.001 to about 0.050, preferably from about 0.005 to about 0.010 inch. Thus, sleeve 55 is carried in a sealed manner with respect to shaft 10 because of seal means 58. Because seal means 58 is resilient, sleeve 55 is also carried in a laterally-movable manner with respect to its carrying member (shaft 10). In this manner, should shaft 10 be subject to lateral displacement for any reason, shaft 10 is free to move for a distance equal to the length of space 59 without affecting the vertical alignment of sleeve 55 and, therefore, without disrupting the substantially full area contact 57 between lip 54 and sleeve 55. Of course, a similar arrangement could be employed whereby the seal means was carried by shaft 10 and the sealing surface means carried by housing 26 if desired.

Since support members 50 and 51 do not contact sleeve 55, the only portion of the seal means which does contact sleeve 55 is lip 54, and since shaft 10 is laterally movable for a finite length independently of sleeve 55, sealing contact between lip 54 and sleeve 55 over substantially the complete sealing surface 57 of lip 54 can be maintained notwithstanding slight lateral displacement of sleeve 10 or housing 26 due to manufacturing or wear related variances. This would not be true if lip 54 were to bear directly on the outer surface of shaft 10 for should either or both of shaft 10 and housing 26 have some slight lateral displacement, part of the sealing contact area 57 between lip 54 and sleeve 55 would be broken thereby decreasing the efficiency of the seal means and also causing increased wear on the remaining portion of lip 54 that remains in contact with sleeve 55. This breaking of the sealing contact area causes premature wear of the seal means which in turn can cause seal means failure prior to wearing out of bit 9. By the use of sleeve 55 in the manner shown in FIG.

2, full contact over area 57 of lip 54 is maintained so that the full design life of seal means 53 is realized and so that bit 9 will wear out before seal means 53.

In operation, the downhole motor is energized by electricity, drilling fluid energy, etc., thus rotating shaft 20 and in turn rotating shaft 10 and bit 9. Drill string 6 may be stationary or rotating at the same or lesser rate of rotation as shaft 10. In any of these cases roller bearings 65 and ball bearings 39 transmit some radial forces between shaft 10 and housing 26. Drilling fluid pumped down the interior of the drill string 6 passes into chamber 27 and is at a pressure $P_1$ in chamber 27 and in the interior of shaft 10. There is a pressure drop through bit 9 so that the drilling fluid emerging from the bottom of bit 9 is at a lower pressure $P_2$, this lower pressure obtaining outside housing 26. The interior of section 30 is substantially at pressure $P_1$. Should lubricant escape from section 30 thereby decreasing the pressure below $P_1$, piston 80 will be forced downwardly by the drilling fluid pressure above piston 80 until the pressure in section 31 increases to $P_1$. The pressure in section 32 is $P_2$ and even though $P_2$ can be substantially less in magnitude than $P_1$, the greater pressure is maintained in section 30 and the lesser pressure is maintained in section 32 by way of the seal means in section 31. It can be seen that drilling fluid above piston 80, inside shaft 10, and outside housing 26 (even where housing 26 adjoins shaft 10 in the vicinity of seal means 33), is completely excluded from reaching any of the bearing devices in sections 30 and 32 and that the bearing devices in sections 30 and 32 are provided with their own self-contained reservoir of high grade lubricant. Thus, bearing life potential is maximized by sealing all bearings in high grade lubricant and by excluding solid particle-containing drilling fluid from all the bearings.

It can be seen that the seal means in section 31 is the main seal since it holds the pressure differential between $P_1$ and $P_2$. This seal means can be any rotating (dynamic) seal which can hold a pressure differential of from about 500 to about 800 psig at a shaft 10 rotation rate of 1500 rpm. It can further be seen that the main thrust bearing device is that which contains roller bearings 36 since it transmits the weight on the bit as provided by drill string 6 less the much smaller down thrust due to the drilling fluid pressure drop across the downhole motor, if any.

The combination bearing device in section 30, on the other hand, carries the pressure down thrust toward bit 9, if any, when it is greater than the bit weight provided by drill string 6. The combination bearing in section 30 also functions as a radial bearing together with the ball bearings 39 to help maintain precise running alignment between shaft 10 and housing 26 and to help minimize the amount of lateral displacement to be taken up by space 59. Of course, more than one bearing device can be employed in section 30 and only one bearing device can be employed in section 32, or any combination of various bearing devices can be used in either section so long as the desired results are achieved. Bit 9 can be any conventional drilling bit, such as a diamond bit, rotary bit, insert bit, and the like.

Figure 3:
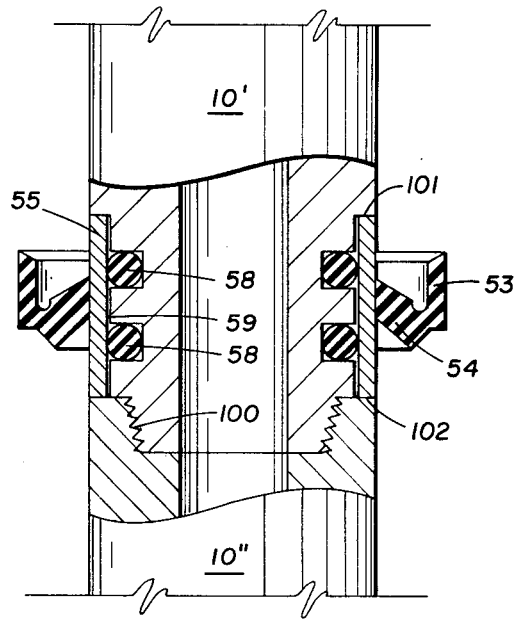
FIG. 3 shows a modification of the embodiment of FIG. 2.

FIG. 3 shows a variation of the sealing surface means 55 of FIG. 2 in that shaft 10 is split into two portions, an upper portion 10' and lower portion 10'', which threadably engage one another at 100. Shaft portion 10' has an annular inset cut into its outer surface for receiving sleeve 55 and to provide an upper shoulder 101 which takes the place of the upper snap ring 56 of FIG. 2. An outer portion of shaft portion 10'' provides a lower shoulder 102 which takes the place of lower snap ring 56 of FIG. 2.

Figure 4:
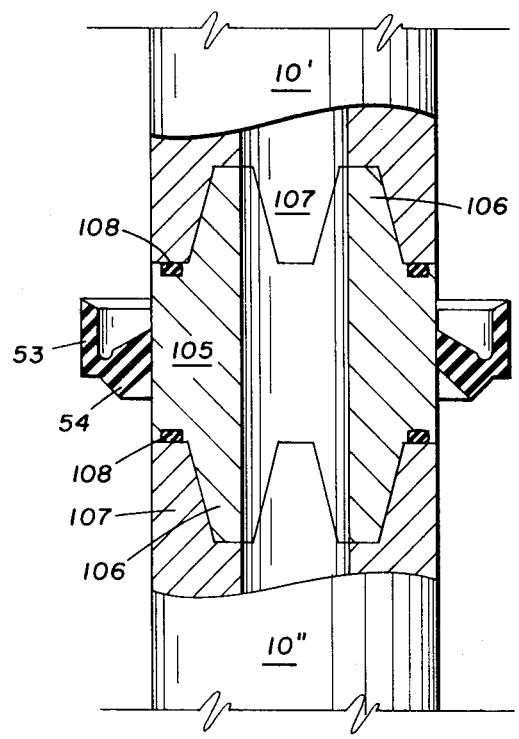
FIG. 4 shows another embodiment within this invention.

FIG. 4 shows yet another embodiment wherein shaft 10 is again split into an upper portion 10' and a lower portion 10'' but the two sections are separated completely from one another by the sealing surface means 105. Sealing surface means 105 has a plurality of splines 106 on its upper and lower surfaces which mate with a plurality of splines 107 carried by shaft portions 10' and 10''. Thus, sealing surface means 105, because splines 106 can be made to loosely interconnect with splines 107, maintains substantially complete sealing contact with lip 54 notwithstanding lateral movement of either or both of shaft portions 10' and 10''. The junctions between sealing surface means 105 and shaft portions 10' and 10'' can be sealed by way of conventional O-rings 108 or any other desired sealing means such as by coating splines 106 and 107 with a rubber or other flexible coating.

Reasonable variations and modifications are possible within the scope of this disclosure without departing from the spirit and scope of this invention.

The embodiments of the invention in which an exclusive property or privilege is claimed are defined as follows:

1. In a well drilling tool whereby a drill bit is rotated in the earth to drill a wellbore, the improvement comprising a downhole motor means, a shaft member connected at one end to said motor, the other end of said shaft member being adapted to carry a drill bit, a housing member carried concentric with said shaft member and spaced therefrom thereby providing a chamber between said housing member and shaft member, at least one bearing means in said chamber, first seal means in said chamber, said first seal means being carried by one of said housing member or shaft member, a sealing surface means carried by and spaced from the member which does not carry said seal means, said sealing surface means being carried by its carrying member in a sealed manner, at least a portion of said seal means contacting an area of said sealing surface means in a sealing manner, said sealing surface means comprising an elongate section carried intermediate said seal means and the non-seal-carrying member, said section extending over substantially the full sealing-contacting area of said seal means, said section being laterally movable in a sealed manner with respect to its carrying member so that said section maintains substantially full area contact with said seal means notwithstanding lateral displacement of said housing member or shaft member.

2. A tool according to claim 1 wherein second seal means is in said chamber between said housing member and shaft member near the end of said housing member closest to said bit, at least one bearing means on either side of said first seal means; third seal means between said housing member and shaft member near the end of said housing member furthest from the bit end of said shaft member.

3. A tool according to claim 2 wherein all said seal means are dynamic seals which seal against a rotating surface, said third seal means comprises a piston means which is movable both rotatably and longitudinally in said chamber and which serves as a dynamic seal between said housing member and shaft member when either or both are stationary or rotating.

4. A tool according to claim 2 wherein there is at least one roller bearing device on a first side of said first seal means, said device having the rollers disposed at an angle between the longitudinal and transverse axes of said shaft member, at least one ball bearing device and at least one roller bearing device on a second side of said first seal means and conduit means for the circulation of lubricant between said roller bearings and ball bearings on said second side, said shaft member is hollow and has at least one aperture therein located to admit drilling fluid to the interior thereof upstream of said third seal means.

5. A tool according to claim 1 wherein said housing member carries said first seal means, said elongate section of said sealing surface means comprises a sleeve carried by said shaft member, said sleeve being concentric around and spaced from said shaft member, said sleeve being intermediate said first seal means and said shaft member, fourth seal means intermediate said sleeve and shaft member, said fourth seal means being resilient so that lateral displacement of said shaft member is taken up by said fourth seal means and said lateral displacement is not substantially transferred to said sleeve, the contact area between said first seal means and said sleeve thereby being left undisturbed.

6. A tool according to claim 1 wherein said first seal means comprises at least one elastic lip seal, said lip seal being supported by metal support members, said lip seal being impregnated with lubricant.

7. A tool according to claim 6 wherein said lip seal is rubber and contains solid lubricant.

8. A tool according to claim 7 wherein said lip seal contains a plurality of layers of fibers, at least one layer being composed of porous fibers that act as a wick for liquid lubricant, and at least one other layer being composed of fibers which have a substantially greater tensile strength than said porous fibers.

* * * * *